US012680669B2

(12) United States Patent
De Bevilacqua et al.

(10) Patent No.: US 12,680,669 B2
(45) Date of Patent: Jul. 14, 2026

(54) LED LIGHTING SYSTEM

(71) Applicant: ARTEMIDE S.P.A., Milan (IT)

(72) Inventors: Carlotta Francesca Isolina Maria De Bevilacqua, Milan (IT); Roberto Franzosi, Milan (IT); Laura Pessoni, Milan (IT)

(73) Assignee: ARTEMIDE S.P.A. (IT)

( * ) Notice: Subject to any disclaimer, the term of this patent is extended or adjusted under 35 U.S.C. 154(b) by 0 days.

(21) Appl. No.: 19/062,263

(22) Filed: Feb. 25, 2025

(65) Prior Publication Data

US 2025/0271118 A1 Aug. 28, 2025

(30) Foreign Application Priority Data

Feb. 27, 2024 (IT) ........................ 102024000004195

(51) Int. Cl.

| | |
|---|---|
| ***F21V 7/00*** | (2006.01) |
| ***F21V 5/04*** | (2006.01) |
| ***F21V 7/04*** | (2006.01) |
| *F21Y 115/10* | (2016.01) |

(52) U.S. Cl.

CPC ............ *F21V 7/0066* (2013.01); *F21V 5/048* (2013.01); *F21V 7/048* (2013.01); *F21Y 2115/10* (2016.08)

(58) Field of Classification Search

CPC ........ F21V 7/0066; F21V 5/048; F21V 7/048; F21V 5/00; F21V 5/02; F21V 5/04; F21V 5/007; F21V 7/00; F21V 7/0083; F21Y 2115/10

See application file for complete search history.

(56) References Cited

U.S. PATENT DOCUMENTS

| | | | | |
|---|---|---|---|---|
| 4,903,180 | A | 2/1990 | Taylor et al. | |
| 6,367,950 | B1 * | 4/2002 | Yamada | F21S 43/249 362/241 |
| 11,719,412 | B2 | 8/2023 | De Bevilacqua et al. | |
| 2011/0249462 | A1 | 10/2011 | Koizumi et al. | |
| 2018/0231209 | A1 * | 8/2018 | Schwalenberg | G02B 3/08 |
| 2019/0360664 | A1 * | 11/2019 | Liu | F21V 7/048 |
| 2020/0355896 | A1 | 11/2020 | Woodgate et al. | |
| 2022/0282851 | A1 * | 9/2022 | De Bevilacqua | H10H 20/855 |

FOREIGN PATENT DOCUMENTS

CN 102748706 B 11/2014

OTHER PUBLICATIONS

Search Report issued in Italian Application No. 102024000004195.

* cited by examiner

*Primary Examiner* — Bao Q Truong

(74) *Attorney, Agent, or Firm* — The Belles Group, P.C.

(57) ABSTRACT

An LED lighting system comprises a support base, a printed circuit board provided with a plurality of LEDs, and a plurality of optical elements aligned with respective LEDs along respective axes is disclosed. Each optical element extends along and around the respective axis and comprises a central lens arranged along the axis and made of a transparent material, and a lateral hollow structure, substantially cup-shaped and positioned around the axis and the lens. The structure is also made of a transparent material and has a prismatic outer lateral surface provided with a series of longitudinal prismatic ridges arranged side by side and separated by grooves.

13 Claims, 4 Drawing Sheets

LED LIGHTING SYSTEM

CROSS-REFERENCE TO RELATED APPLICATIONS

This patent application claims priority from Italian patent application no. 102024000004195 filed on Feb. 27, 2024, the entire disclosure of which is incorporated herein by reference.

TECHNICAL FIELD

The present invention relates to an LED lighting system capable of ensuring the control of the light emission generated by sources of small dimensions, such as LEDs, and avoiding dazzling phenomena.

BACKGROUND

It is known that most—whether small-, medium- or high-power—LEDs have a diffuse (also called Lambertian) emission.

It is because of this characteristic that lighting devices with an LED source must be provided, so as not to dazzle observers, with optical elements capable of deflecting some of the light into angles that do not affect users' vision.

For example, recent solutions use a lens associated with the LED placed close to the same and capable of collecting and controlling 100% of the emitted light flux. Such lenses direct almost all of the light within the desired angles, but a small portion, due to internal reflections and material impurities, is scattered above the required angular limit.

To eliminate this problem, each lens is provided with a black anti-dazzling screen, typically in the shape of a truncated pyramid, usually with a square or hexagonal base.

This solution is very effective in terms of visual comfort, but reduces the efficiency of the lighting device, as well as requiring the manufacture and assembly of an additional component consisting in the anti-dazzling screen.

It is therefore an object of the present invention to provide an LED lighting system that allows the drawbacks of the prior art highlighted here to be overcome.

In particular, it is an object of the invention to provide an extremely compact, simple, and highly efficient LED lighting system that can provide a light emission with a high visual comfort, without creating dazzling at least within the current regulatory limits in effect, and at the same time with a very high optical efficiency.

SUMMARY

The present invention thus relates to an LED lighting system as defined in the appended claim 1.

Further preferred characteristics of the invention are defined in the dependent claims.

The lighting system of the invention allows, without resorting to anti-dazzling screens, practically the entire light emission of the LED sources to be recovered and redirected to the desired emission angles.

In essence, the light emitted by the single LED source initially encounters a lens that can collect 100% of the emission and direct almost all of it within defined angles.

The diffused part of the emission, which is scattered above the required angular limit due to internal reflections and impurities of the lens material, subsequently encounters a structure outside the lens, arranged around the lens and likewise transparent, which forms a monolithic body together with the lens.

The outer structure is in the form of a hollow solid, typically with a quadrangular or hexagonal base, an appropriately designed cross section, and with the outer lateral surface which is knurled at 90°.

By virtue of this particular design of the outer surface, by the effect of total internal reflection (TIR), the light exiting the lens is retroreflected by catadioptric effect and directed, thanks to the appropriate cross section of the hollow outer structure, within the useful angles.

This yields extremely high efficiency values, around 95% with light emitted within angles of between 45 to 60 degrees relative to the vertical.

All in all, the LED lighting system of the invention is extremely compact, simple, and highly efficient, and provides a light emission with a high visual comfort and simultaneously a very high optical efficiency.

BRIEF DESCRIPTION OF THE DRAWINGS

Further characteristics and advantages of the present invention will become clear from the description of the following non-limiting example embodiments, with reference to the figures of the accompanying drawings, wherein.

DETAILED DESCRIPTION

Figure 1:
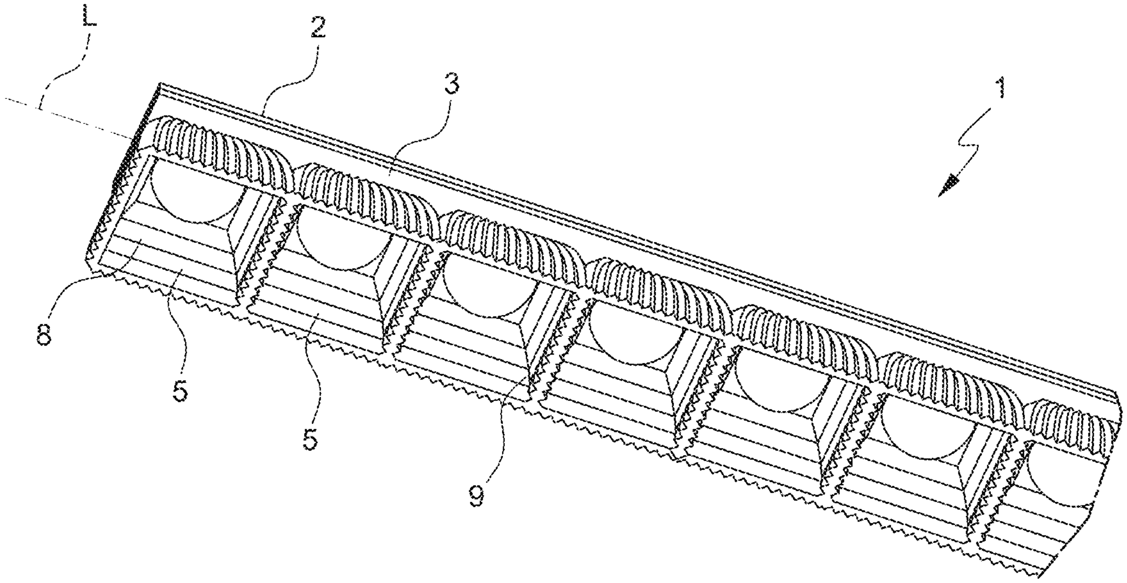
FIG. 1 is a partial bottom perspective view of an LED lighting system according to a first embodiment of the invention.
Figure 2:
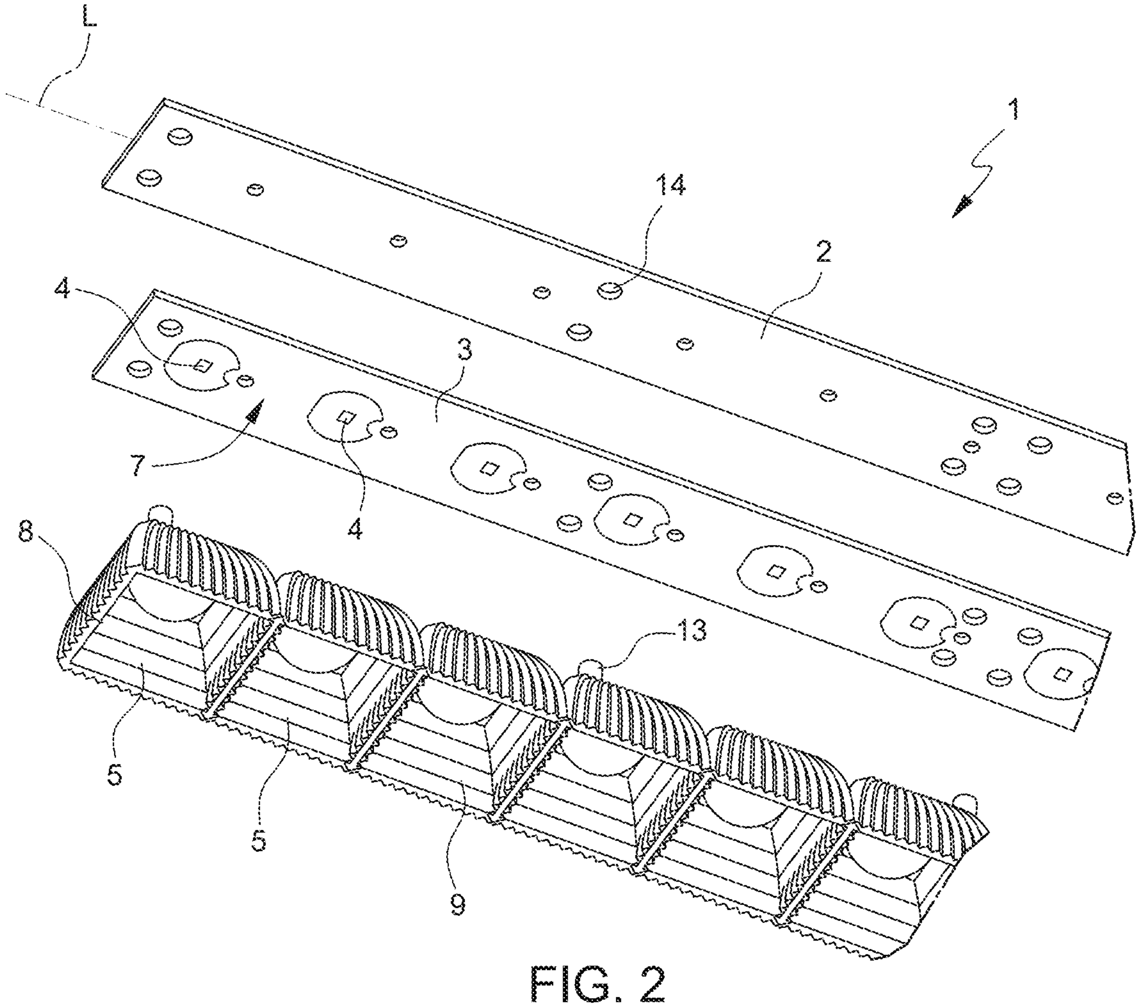
FIG. 2 is an exploded view of the lighting system of FIG. 1.
Figure 3:
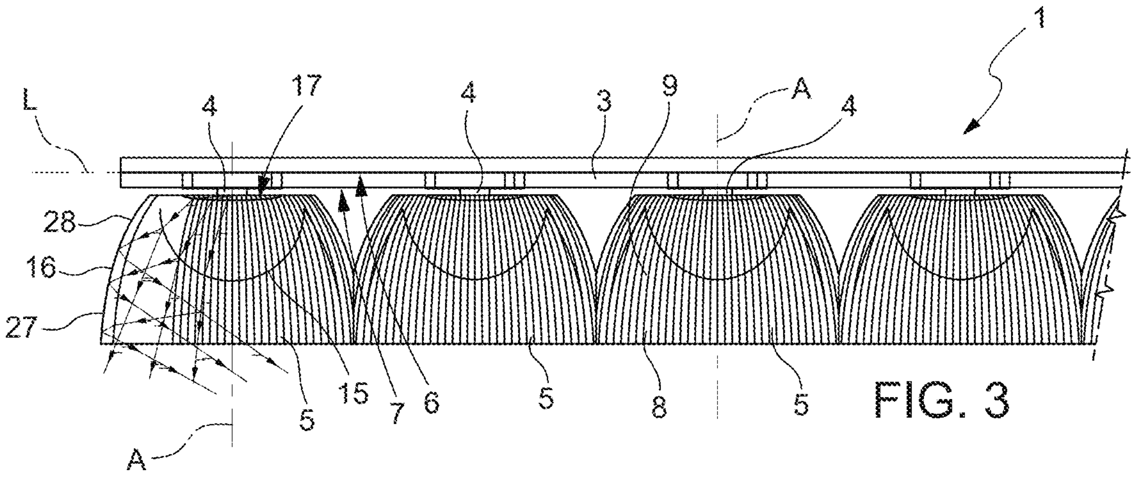
FIG. 3 is a partially sectioned side view of the lighting system of FIG. 1.
Figure 4:
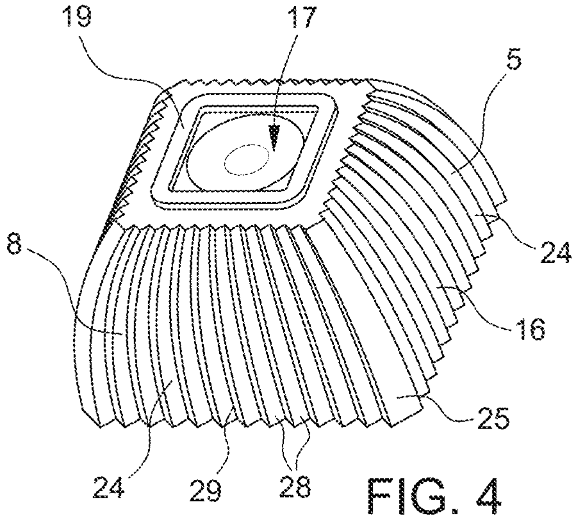
FIGS. 4-7 are respectively a top perspective view, a bottom perspective view, a top plan view, and a longitudinal sectional view of an optical element that is part of the lighting system of FIG. 1.
Figure 5:
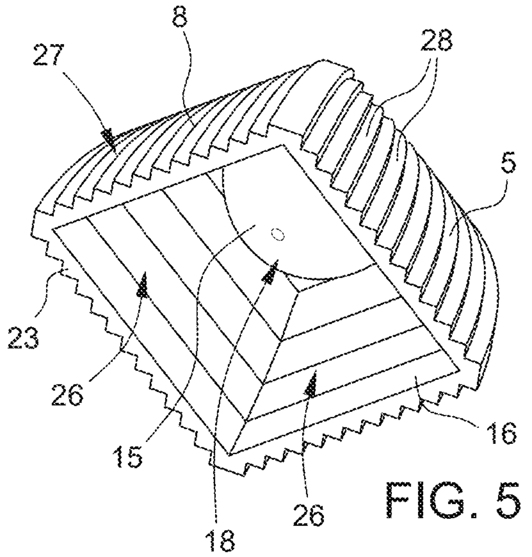
Figure 6:
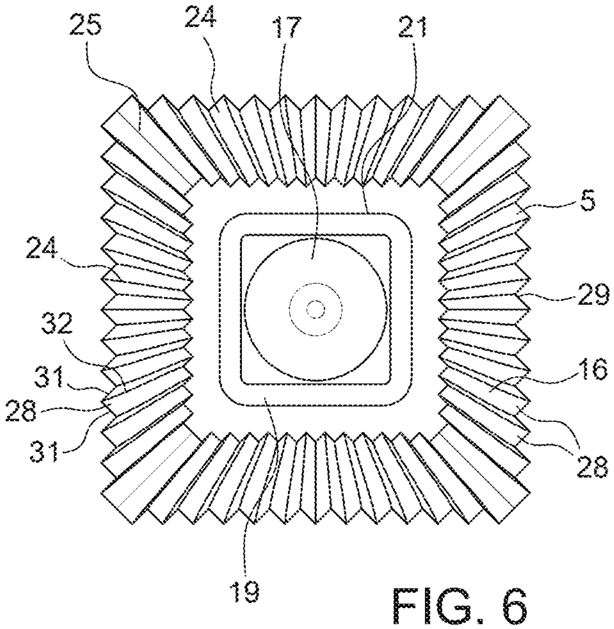
Figure 7:
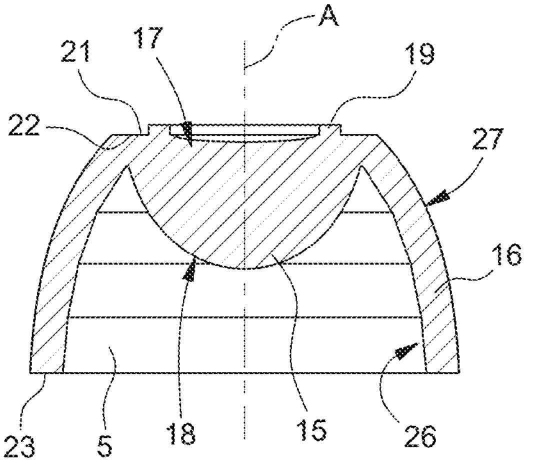

In FIGS. 1 to 3, the reference number 1 indicates, as a whole, an LED lighting system for the lighting of spaces, in particular for the lighting of interior spaces.

The lighting system 1 comprises a support base 2, a printed circuit board (PCB) 3 provided with a plurality of LEDs 4, and a plurality of optical elements 5 associated with respective LEDs 4.

The assembly formed by the base 2, board 3, and optical elements 5 can be housed in a casing and/or be supported by an external support structure, which are configured in various manners depending on the intended use and application of the lighting system 1 and which are not described or illustrated as they are not essential to the present invention.

The base 2 can have various shapes and dimensions and be made of different materials. In the non-limiting example of FIGS. 1-3, the base 2 consists of a flat, rectangular plate extending along a longitudinal axis L.

The board 3 is positioned on a face 6 of the base 2 and likewise extends along the longitudinal axis L.

The LEDs 4 are positioned on a face 7 of the board 3 opposite to the base 2 and are, for example, aligned and equally spaced along the longitudinal axis L.

Each LED 4 faces and is aligned, along an axis A perpendicular to the longitudinal axis L, with an optical element 5, consisting of a monolithic body 8 made of transparent material, in particular a polymeric material, e.g. PMMA.

Advantageously, a plurality of optical elements 5 forms a single monolithic piece 9 of transparent material, comprising a plurality of bodies 8 aligned with each other along the axis L and joined laterally to each other, with their respective A axes parallel to each other.

The piece 9 is advantageously provided with coupling members 13 in order to fasten the piece 9 to the base 2 and clamp the board 3 between the piece 9 and the base 2; for example, the coupling members 13 are pins that project from the piece 9 parallel to the axes A and are inserted into respective seats 14 formed on the base 2.

Clearly, the system 1 is suitable for implementation in modular form with modules formed by a single optical element 5 or by a piece 9 formed by a plurality of optical elements 5, mounted on respective bases 2 and boards 3 or on a common base 2 and/or board 3.

As illustrated in greater detail in FIGS. 4-7, each optical element 5 extends along and around the respective axis A, also defining an optical axis of the optical element 5.

The optical element 5 comprises a central lens 15 arranged along the axis A and a lateral hollow structure 16 positioned around the lens 15.

The lens 15 and the structure 16 constitute two parts of the same monolithic body 8 and are made of the same transparent material, e.g. PMMA.

The lens 15 is a refractive lens extending along the axis A between a concave inlet surface 17, facing the respective LED 4, and a convex outlet surface 18. The lens 15 is preferably in the shape of a rotation solid around the axis A and thus has a circular cross section (orthogonal to the axis A).

Preferably, the inlet surface 17 is surrounded by a collar 19 that projects from the inlet surface 17 toward the board 3 and surrounds the LED 4. In the illustrated non-limiting example, the collar 19 has a square shape, but it is understood that the collar can have some other, for example circular, shape.

The lens 15 is configured to intercept, in particular with the inlet surface 17, the light emitted by the LED 4 and direct at least 80%, particularly between 85% and 90%, of the light emitted by the LED 4 into a light beam, exiting the outlet surface 18, having a predetermined angle of emission.

The remaining fraction of the light emitted by the LED 4, which would be outside the desired light beam, is intercepted by the structure 16.

The structure 16 is a substantially cup-shaped hollow structure and projects from a radially outer perimeter edge 21 of the lens 15 and extends around the axis A and the lens 15 between a root edge 22, joined to the perimeter edge 21 of the lens 15, and a free end edge 23.

In general, the structure 16 has a polygonal shape in plan view (or in a cross section orthogonal to the axis A), having a plurality of side walls 24 joined by corners 25.

In the example of FIGS. 1-7, the structure 16 has a substantially square shape in plan view (i.e. in cross section). It is understood that the structure 16 can have a different shape, as will also be described in the following.

The side walls 24 are preferably curved in the axial direction, i.e. parallel to the axis A (here and in the following, axial or longitudinal direction is understood to be a direction substantially parallel to the axis A), i.e. they are curved around axes orthogonal to the axis A.

The structure 16 has an inner lateral surface 26, facing the axis A and the lens 15, and an outer lateral surface 27, both preferably curved (like the side walls 24) parallel to the axis A.

The outer lateral surface 27 is a prismatic surface that has a series of longitudinal prismatic ridges 28 arranged side by side and separated by grooves 29, while the inner lateral surface 26 is smooth, i.e. free of grooves and ridges.

In particular, the outer lateral surface 27 has a series of alternating ridges 28 and grooves 29 extending along the side walls 24 in the axial direction from the root edge 22 to the free end edge 23; the ridges 28 are likewise curved, like the outer lateral surface 27, in the axial direction.

Each ridge 28 is delimited by a pair of sides 31 converging at an edge 32; advantageously, the sides 31 are inclined with respect to each other at an angle between 85° and 95°, preferably 90°.

As schematically shown in FIG. 3, the light emitted by each LED 4 initially encounters the respective lens 15, entering the lens 15 through the inlet surface 17; the lens 15 is configured to collect the entire light emission of the LED 4 and direct almost all of it (at least 80%, indicatively 85% and 90%) into a light beam having a predetermined angle of emission around the axis A.

The remaining fraction of the light emitted by the LED 4, which due to internal reflections and impurities of the lens material 15 is scattered outside the desired light beam, is intercepted by the structure 16, which is configured in such a manner that the light exiting the lens 15 is retroreflected by catadioptric effect and directed, thanks to the cross section of the hollow structure 16 and the presence of the ridges 28 on its outer lateral surface 27, within useful angles, i.e. into the desired light beam.

This yields extremely high efficiency values, around 95% with light emitted within angles between 45 to 60 degrees relative to the axis A.

Figure 8:
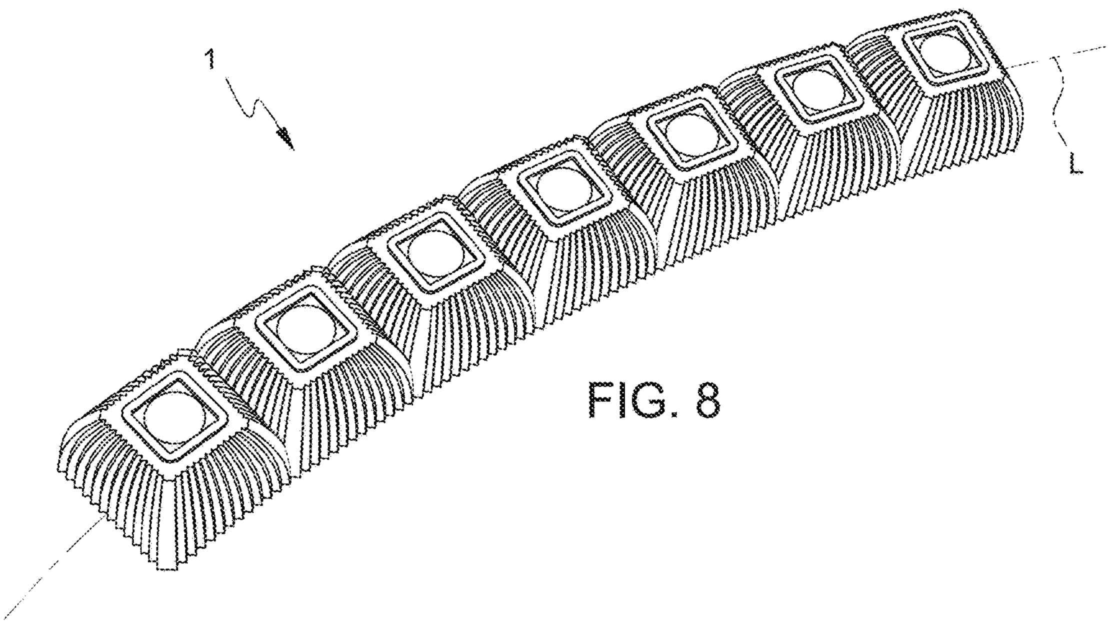
FIGS. 8 and 9 are respectively a top perspective view and a bottom perspective view, with parts removed for clarity, of a second embodiment of the lighting system of the invention.
Figure 9:
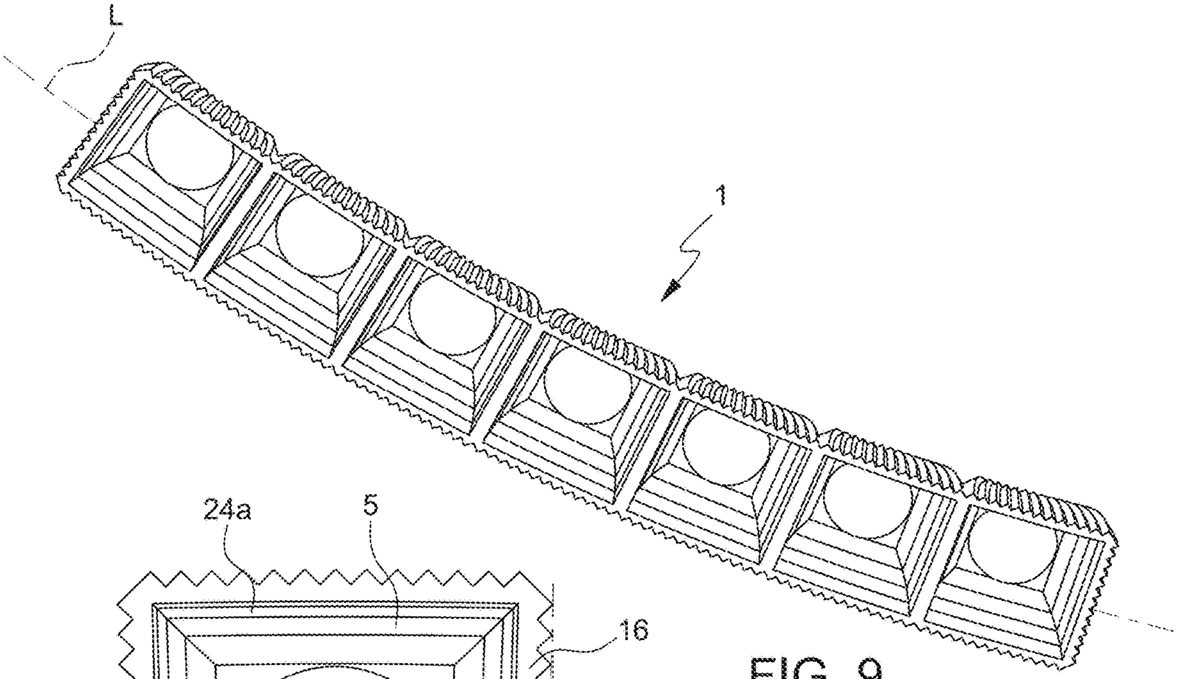

In the variant shown in FIGS. 8-9, the system 1 (or a single module of the system 1) extends along a curved longitudinal axis L (not straight as in the example of FIGS. 1-3). With curved modules, it is possible to implement systems 1 that are curvilinear, circular, elliptical, etc. in shape.

Figure 10:
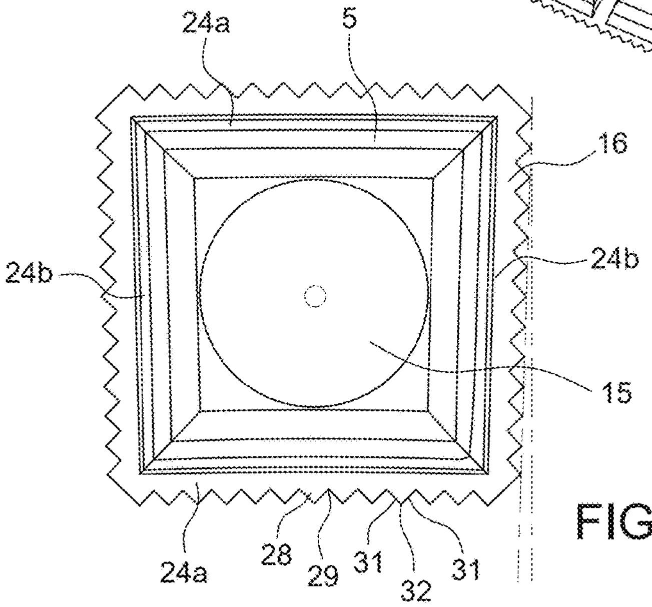
FIG. 10 is a bottom plan view of a detail of the lighting system of FIGS. 8 and 9.

In this case, the single optical element 5, otherwise entirely analogous to what has been described in the foregoing, has a trapezoidal shape in plan view, as shown in FIG. 10. In particular, the optical element 5 has a pair of side walls **24*a* parallel to each other and a pair of oblique side walls 24*b***.

It is understood that the optical element can have a still different shape, in order to implement lighting modules or systems that are developed with still different patterns from those shown here purely by way of example.

Figure 11:
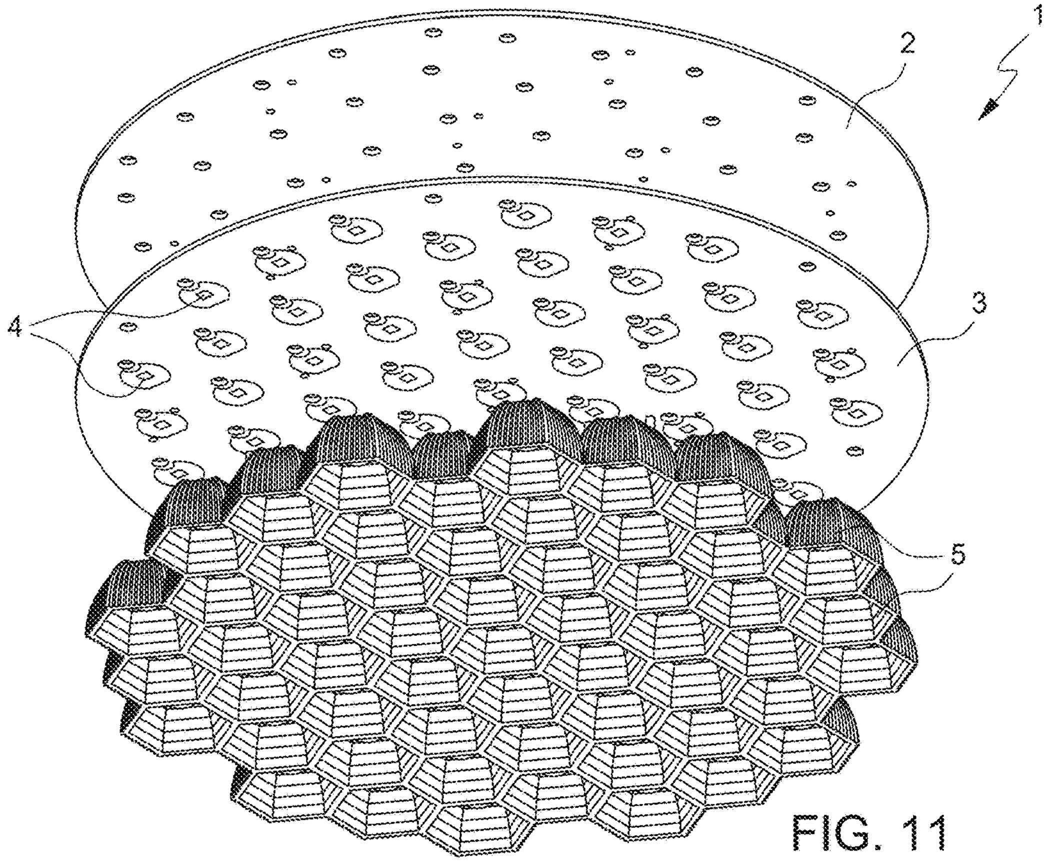
FIGS. 11 and 12 are respectively an exploded perspective view and a plan view from below of a third embodiment of the lighting system of the invention.
Figure 12:
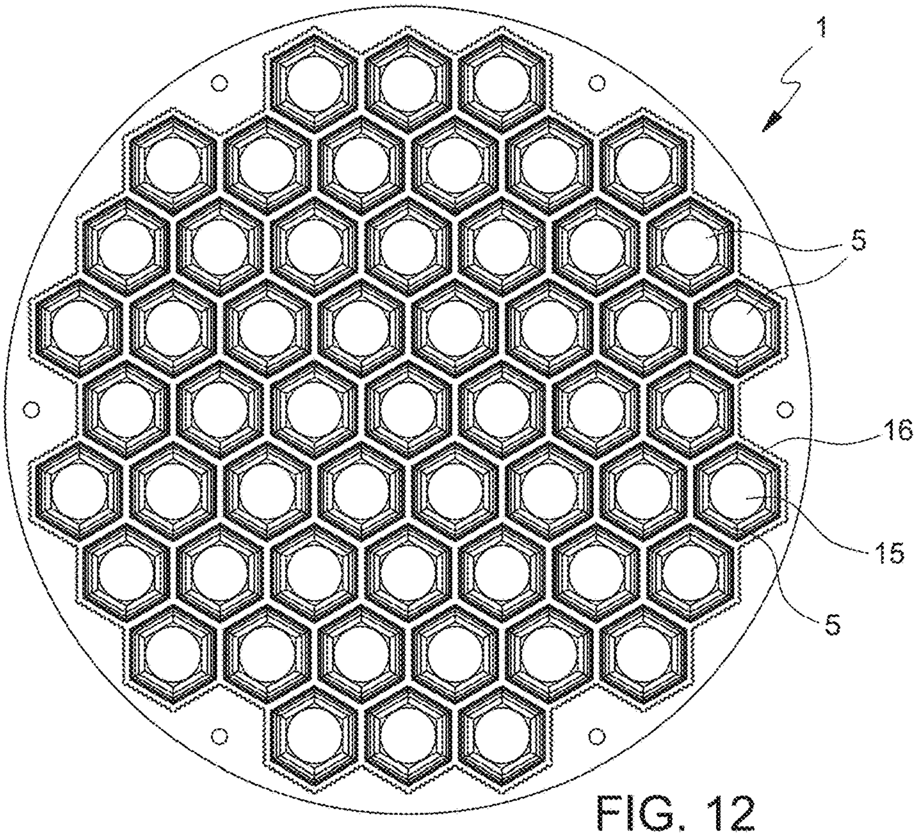

For example, in the embodiment shown in FIGS. 11-12, the optical elements 5 are hexagonal in shape and are arranged in a honeycomb pattern, suitable for implementing a circular system 1. The base 2 and the board 3 are thus, for example, substantially circular.

Finally, it is clear that further modifications and variations can be made to the lighting system described and illustrated herein without departing from the protective scope of the present invention, as defined in the appended claims.

What is claimed is:

1. An LED lighting system, comprising:

a support base, a printed circuit board provided with a plurality of LEDs, and a plurality of optical elements aligned with respective LEDs along respective axes, wherein each optical element extends along and around the respective axis and comprises:

a central lens arranged along the axis and made of a transparent material, and a lateral hollow structure substantially cup-shaped and positioned around the axis and the lens, wherein the structure is made of a transparent material and has a prismatic outer lateral surface provided with a series of longitudinal prismatic ridges arranged side by side and separated by grooves;

wherein the lens is configured to intercept the light emitted by the respective LED and direct a main fraction of the light emitted by the LED, greater than at least 80%, particularly between 85% and 90%, into a light beam having a predetermined angle of emission; and wherein the structure is configured to intercept a fraction of the light exiting the lens outside said light beam and to retroreflect by catadioptric effect said fraction and direct said fraction into said light beam having said predetermined angle of emission; and wherein the lens extends along the axis between a concave inlet surface, facing the respective LED, and a convex outlet surface, and the inlet surface is surrounded by a collar that projects from the inlet surface toward the printed circuit board and surrounds the LED.

2. The lighting system according to claim 1, wherein each optical element comprises a monolithic body made of a transparent material, particularly a polymeric material, e.g. PMMA; and the lens and the structure constitute two parts of the same monolithic body and are made of the same transparent material.

3. The lighting system according to claim 1, wherein the structure is a substantially cup-shaped hollow structure and projects from a radially outer perimeter edge of the lens and extends around the axis and the lens between a root edge, joined to the perimeter edge of the lens, and a free end edge; and wherein the prismatic ridges and the grooves extend in the axial direction from the root edge to the free end edge.

4. The lighting system according to claim 1, wherein the prismatic ridges are curved in the axial direction.

5. The lighting system according to claim 1, wherein each prismatic ridge is delimited by a pair of sides converging at an edge.

6. The lighting system according to claim 5, wherein the sides are inclined with respect to each other at an angle between 85° and 95°, preferably at an angle of 90°.

7. The lighting system according to claim 1, wherein the structure has a polygonal shape in cross-section, having a plurality of side walls joined to each other.

8. The lighting system according to claim 7, wherein the side walls are curved in the axial direction.

9. The lighting system according to claim 1, wherein the structure has a substantially square, trapezoidal, or hexagonal shape in cross-section.

10. The lighting system according to claim 1, wherein the structure has an inner lateral surface, facing the axis and the lens, which is curved parallel to the axis and smooth, i.e. free of ridges and grooves.

11. The lighting system according to claim 1, wherein the lens is a refractive lens extending along the axis between a concave inlet surface, facing the respective LED, and a convex outlet surface; the lens being in the shape of a rotation solid about the axis.

12. The lighting system according to claim 1, wherein a plurality of optical elements forms a single monolithic piece in transparent material, comprising a plurality of bodies joined laterally to each other.

13. An LED lighting system, comprising:

a support base, a printed circuit board provided with a plurality of LEDs, and a plurality of optical elements aligned with respective LEDs along respective axes, wherein each optical element extends along and around the respective axis and comprises:

a central lens arranged along the axis and made of a transparent material, and a lateral hollow structure substantially cup-shaped and positioned around the axis and the lens, wherein the structure is made of a transparent material and has a prismatic outer lateral surface provided with a series of longitudinal prismatic ridges arranged side by side and separated by grooves, wherein the structure has a substantially square or trapezoidal shape in cross-section;

wherein the lens is configured to intercept the light emitted by the respective LED and direct a main fraction of the light emitted by the LED, greater than at least 80%, particularly between 85% and 90%, into a light beam having a predetermined angle of emission;

wherein the structure is configured to intercept a fraction of the light exiting the lens outside said light beam and to retroreflect by catadioptric effect said fraction and direct said fraction into said light beam having said predetermined angle of emission.

* * * * *